US010358781B2

(12) United States Patent
Kuczenski

(10) Patent No.: US 10,358,781 B2
(45) Date of Patent: Jul. 23, 2019

(54) WHEEL ALIGNMENT FOR LINE STRIPER

(71) Applicant: Graco Minnesota Inc., Minneapolis, MN (US)

(72) Inventor: Steven R. Kuczenski, New Brighton, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 386 days.

(21) Appl. No.: 15/411,022

(22) Filed: Jan. 20, 2017

(65) Prior Publication Data

US 2017/0204570 A1  Jul. 20, 2017

Related U.S. Application Data

(60) Provisional application No. 62/280,773, filed on Jan. 20, 2016.

(51) Int. Cl.
*E01C 23/00* (2006.01)
*E01C 23/22* (2006.01)
(Continued)

(52) U.S. Cl.
CPC ............ *E01C 23/22* (2013.01); *A63C 19/065* (2013.01); *B05B 15/62* (2018.02); *B60B 33/006* (2013.01);
(Continued)

(58) Field of Classification Search
CPC ... E01C 23/22; A63C 2019/067; B60B 33/02; B60B 33/023; B60B 33/006; B60B 33/025; B05B 15/62
(Continued)

(56) References Cited

U.S. PATENT DOCUMENTS 4,624,602 A   11/1986  Kieffer et al.
2001/0029643 A1*  10/2001  Schroeder ........... B60B 33/0021
                                          16/35 R
(Continued)

FOREIGN PATENT DOCUMENTS

CN     2209166 Y   10/1995
CN   102438858 A    5/2012
(Continued)

OTHER PUBLICATIONS

Extended European Search Report for EP Application No. 17152441. 6, dated May 24, 2017, 8 pages.
(Continued)

*Primary Examiner* — Raymond W Addie
(74) *Attorney, Agent, or Firm* — Kinney & Lange, P.A.

(57) ABSTRACT

A line striper comprises a sprayer secured to a frame, and a guided wheel assembly rotatably mounted to the frame. The guided wheel assembly includes an adjustment disk with screw notches along its outer diameter, an alignment plate coaxially surrounding and abutting the adjustment disk, alignment screws threaded through the alignment plate to engage screw notches on the adjustment disk, and an antirotation lock. The screws set a rotational alignment of the alignment plate relative to the adjustment disk, and the adjustment disk is coupled via a spindle axle to a guide wheel. The antirotation lock engages a locking feature on the alignment plate, thereby fixing the orientation of the guide wheel relative to the wheeled frame at an angle determined by the rotational alignment.

20 Claims, 5 Drawing Sheets

(51) Int. Cl.
　　　 B60B 33/02　　　(2006.01)
　　　 B60B 33/00　　　(2006.01)
　　　 B05B 15/62　　　(2018.01)
　　　 A63C 19/06　　　(2006.01)
(52) U.S. Cl.
　　　 CPC ............ *B60B 33/02* (2013.01); *B60B 33/023* (2013.01); *B60B 33/025* (2013.01); *B60B 33/026* (2013.01); *A63C 2019/067* (2013.01); *A63C 2203/12* (2013.01)
(58) Field of Classification Search
　　　 USPC ..................................................... 404/94, 75
　　　 See application file for complete search history.

(56) References Cited

U.S. PATENT DOCUMENTS

| | | | | |
|---|---|---|---|---|
| 2014/0064849 A1* | 3/2014 | Arnold | .................. | E01C 23/185 404/75 |
| 2016/0059628 A1* | 3/2016 | Degrace | .............. | B60B 33/0068 16/35 R |

FOREIGN PATENT DOCUMENTS

| | | |
|---|---|---|
| CN | 104818664 A | 8/2015 |
| CN | 204849556 U | 12/2015 |
| WO | WO2013/170047 A1 | 11/2013 |

OTHER PUBLICATIONS

Office Action from Chinese Patent Application No. 2018100428766, dated Sep. 18, 2018, 12 pages.

\* cited by examiner

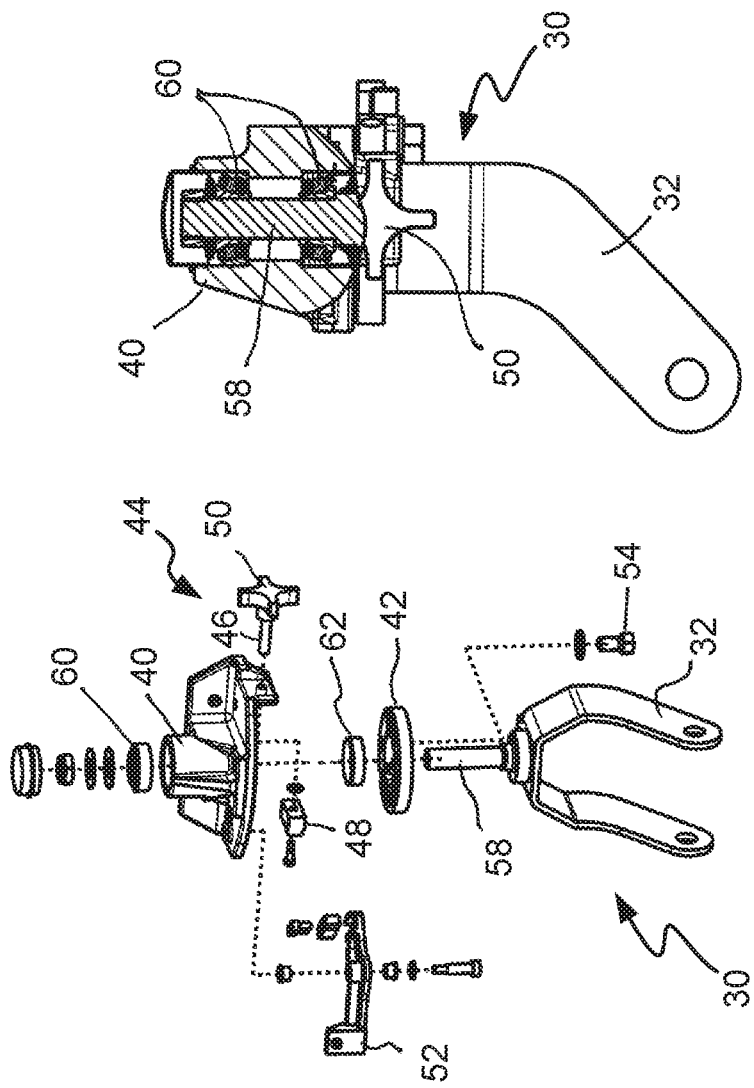

WHEEL ALIGNMENT FOR LINE STRIPER

CROSS-REFERENCE TO RELATED APPLICATION(S)

This application claims the benefit of U.S. Provisional Application No. 62/280,773, filed Jan. 20, 2016 for "Wheel Alignment Guide for Line Striper Sprayer" by Steven R. Kuczenski, which is herein incorporated by reference.

BACKGROUND

The present invention relates generally to wheel alignment systems, and more particularly to an adjustable wheel alignment system for a line striper spray system.

Line striper spray systems are used to produce painted stripes for a variety of applications, including on streets, highways, and athletic fields. Such systems typically include a wheeled cart with a sprayer, a pressurizing pump, and a spray fluid reservoir. The cart is pushed, driven, or guided along a painting path while the sprayer is actuated to paint a line of spray fluid beneath, on the side, or in front of the cart. Spray fluids can, for example, include paints, enamels, oils, solvents, and other solutions.

In line striping applications it is often critical for painted lines to be straight. The orientation of a line striper sprayer is often held constant relative to the orientation of the cart over the course of a spraying action, such that the shape of painted lines is determined exclusively by the travel path of the cart. It is consequently desirable for line stripers to be able to reliably adhere to a straight path. Some line stripers include antirotation locks that fix a guide wheel or wheels of the system in a forward orientation so as to ensure a straight path for the line striper. Misalignments in the guide wheels however, can result in the line striper going off course, and producing lines that are not adequately straight.

SUMMARY

In one aspect, the present invention is directed toward a line striper with a sprayer secured to a frame, and a guided wheel assembly rotatably mounted to the frame. The guided wheel assembly includes an adjustment disk with screw notches along its outer diameter, an alignment plate coaxially surrounding and abutting the adjustment disk, alignment screws threaded through the alignment plate to engage screw notches on the adjustment disk, and an antirotation lock. The screws set a rotational alignment of the alignment plate relative to the adjustment disk, and the adjustment disk is coupled via a spindle axle to a guide wheel. The antirotation lock engages a locking feature on the alignment plate, thereby fixing the orientation of the guide wheel relative to the wheeled frame at an angle determined by the rotational alignment.

In another aspect, the present invention is directed to an alignment method for a line striper comprising a sprayer affixed to frame, and a guide wheel rotatably secured to the frame via a spindle axle. According to this method, an adjustment disk affixed to the spindle axle is surrounded by an alignment coaxial with and rotatable with respect to the adjustment disk. A locking feature of the alignment plate is engaged via an antirotation lock affixed to the frame, and first and second alignment screws are threaded through the alignment plate to engage adjustment surfaces of screw notches in an outer diameter of the adjustment disk. These screws are turned to adjust a rotational orientation of the alignment plate relative to the adjustment disk, such that the guide wheel is oriented in a desired forward direction while the locking feature is engaged by the antirotation lock.

The present summary is provided only by way of example, and not limitation. Other aspects of the present disclosure will be appreciated in view of the entirety of the present disclosure, including the entire text, claims, and accompanying figures.

BRIEF DESCRIPTION OF THE DRAWINGS

FIG. 4 is an exploded perspective view of the wheel assembly of FIGS. 2 and 3.

FIG. 5 is a cross-sectional view of the wheel assembly of FIG. 2-4.

Figure 1:
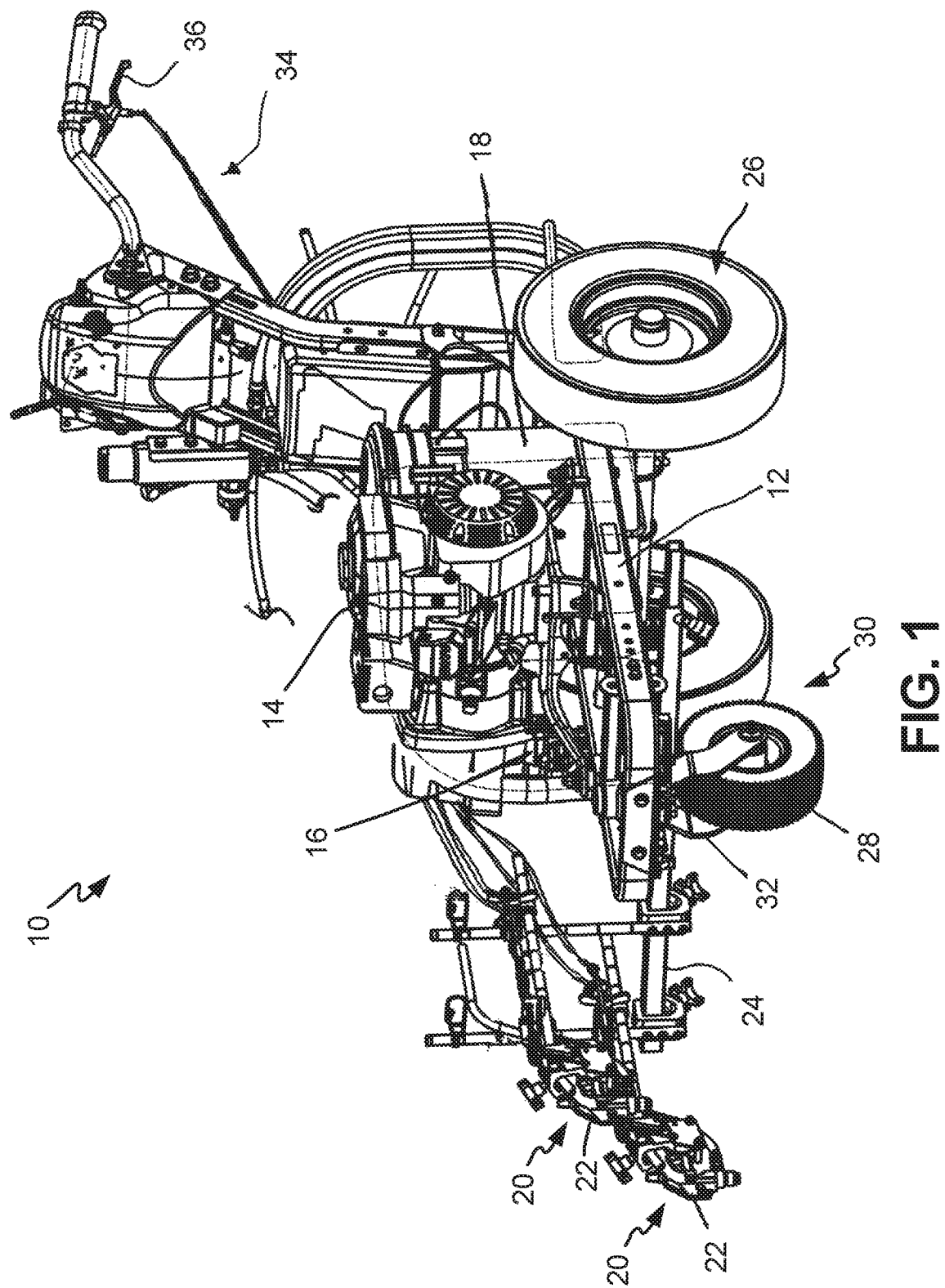
FIG. 1 is a perspective view of a line striper.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present invention introduces a line striper wheel assembly rotatable about a spindle axle. The spindle axle is attached to an adjustment disk coaxial with and coupled to an alignment plate. The alignment plate can selectively engage an antirotation lock to prevent rotation of the axle and thereby the wheel assembly. The precise rotational orientation of the alignment plate with respect to the adjustment disk can be adjusted via two alignment screws secured through the alignment plate. When tightened, these screws abut notches in the otherwise circular outer diameter of the adjustment disk. Rotational adjustments made via these alignment screws determine the angular orientation at which the antirotation lock fixes the wheel assembly. By tightening one screw and loosening another, the fixed orientation of the wheel assembly can be adjusted to ensure straight line painting.

FIG. 1 is a perspective view of line striper 10, which includes frame 12, engine 14, pump 16, fluid reservoir 18, sprayer assemblies 20, sprayers 22, mounting arm 24, wheels 26 (including guide wheel 28 of guided wheel assembly 30), fork 32, operator station 34, and wheel release control 36.

Line striper 10 is a spray system or other fluid applicator system used to dispense fluid and/or other material on a surface. Line striper 10 can, for example, be a mobile applicator system used to paint, spray, or otherwise apply lines, e.g. on pavement or other surfaces. More generally, line striper 10 is an applicator system used in applications for which a reliable and repeatable performance is desired.

Frame 12 of line striper 10 is a rigid support structure that rides on wheels and carries and supports the various components of line striper 10. Frame 12 can, for example, be formed of tubular metal. In the illustrated embodiment frame 12 supports engine 14, pump 16, fluid reservoir 18, and sprayer assemblies 20. Engine 14 can, for example, be a gas-operated internal combustion engine or other portable engine. Engine 14 can charge one or more batteries (not shown), provide direct mechanical input to pump 16 (e.g. via gears or belts and pulleys; not shown), and/or propel line striper 10, among other options. Some embodiments of line striper 10 may eschew engine 14 in favor of other power sources such as a storage battery and electric motor or external power sources (e.g. via a connection to a local power grid).

Pump 16 is a fluid pump disposed to pump a working fluid applied by line striper 10, such as paint, adhesive, oil, water, or solvent. Pump 16 draws this fluid from fluid reservoir 18, which can for example be a paint bucket, trough, barrel, or other fluid source. Pump 16 drives the working fluid to at least one sprayer assembly 20 (e.g. via piston, diaphragm, or other suitable pump mechanism), where it is sprayed or otherwise applied to a working surface. The illustrated embodiment depicts two sprayer assemblies 20 each having a single sprayer 22, both mounted on a common mounting arm 24. More generally, line striper 10 can have any number of sprayer assemblies 20, each of which may have a single sprayer 22 or multiple sprayers 22. Sprayers 22 can be actuated independently or in tandem. Mounting arm 24 supports sprayer assemblies 20 on frame 12, and in some embodiments can be turned, extended, retracted, or angled with respect to frame 12 to adjust a position or orientation of at least one sprayer assembly 20. During the course of spraying activity, however, mounting arm 24 can hold sprayer assembly fixed at a selected position and orientation, such that movement of line striper 10 as a whole fully determines the location of sprayed patterns.

Line striper 10 moves on wheels 26. In the depicted embodiment only guide wheel 28 is capable of changing orientation relative to frame 12. Guide wheel 28 is mounted on guided wheel assembly 30, which includes fork 32. Guided wheel assembly 30 is discussed in greater detail below with respect to FIGS. 2-6, and permits guide wheel 28 to pivot with respect to frame 12, thereby controlling the direction of motion of line striper 10, e.g. whether line striper travels in a straight line or in a turn, or whether a turn is sharp or shallow. In some embodiments line striper 10 can be propelled manually. In other embodiments line striper 10 can be propelled via engine 14 or other onboard power sources, and either directed manually or controlled remotely or automatically.

In the depicted embodiment line striper 10 includes operator station 34, a local operator interface that allows a human operator to guide or control line striper 10. Operator station 34 can, for example, include controls to actuate sprayers 22, drive line striper 10 via motor 14, and/or monitor parameters including performance of line striper 10 and fluid level in fluid reservoir 18. Operator station 34 further includes wheel release control 36. To facilitate the painting of straight lines, line striper 10 includes an antirotation lock (discussed in detail below) capable of fixing the orientation of guide wheel 28. Wheel release control 36 actuates this anti-rotation lock. In some embodiments, this antirotation lock can be active by default, and deactivated only when wheel release control 36 is triggered. In one embodiment, wheel release control 36 pulls a cable when actuated which either fixes the orientation of guide wheel 28 or releases guide wheel 28 to reorient freely. In the illustrated embodiment, guide wheel 28 is the sole free wheel of line striper 10, with other wheels 26 having fixed orientation relative to frame 10. Consequently, the orientation of guide wheel 28 determines the travel path of line striper 10. Alternative embodiments of line striper 10 can have multiple guide wheels, e.g. with a single guided wheel assembly rotating in tandem and governed by wheel release control. When the orientation of guided wheel assembly 30 is fixed, that orientation determines the direction of movement of line striper 10 (and particularly of sprayers 22), and therefore the shape of sprayed patterns. Where a straight or otherwise uniform spray pattern is desired, misalignment of guide wheel 28 can cause curves in the resulting sprayed pattern.

Figure 2:
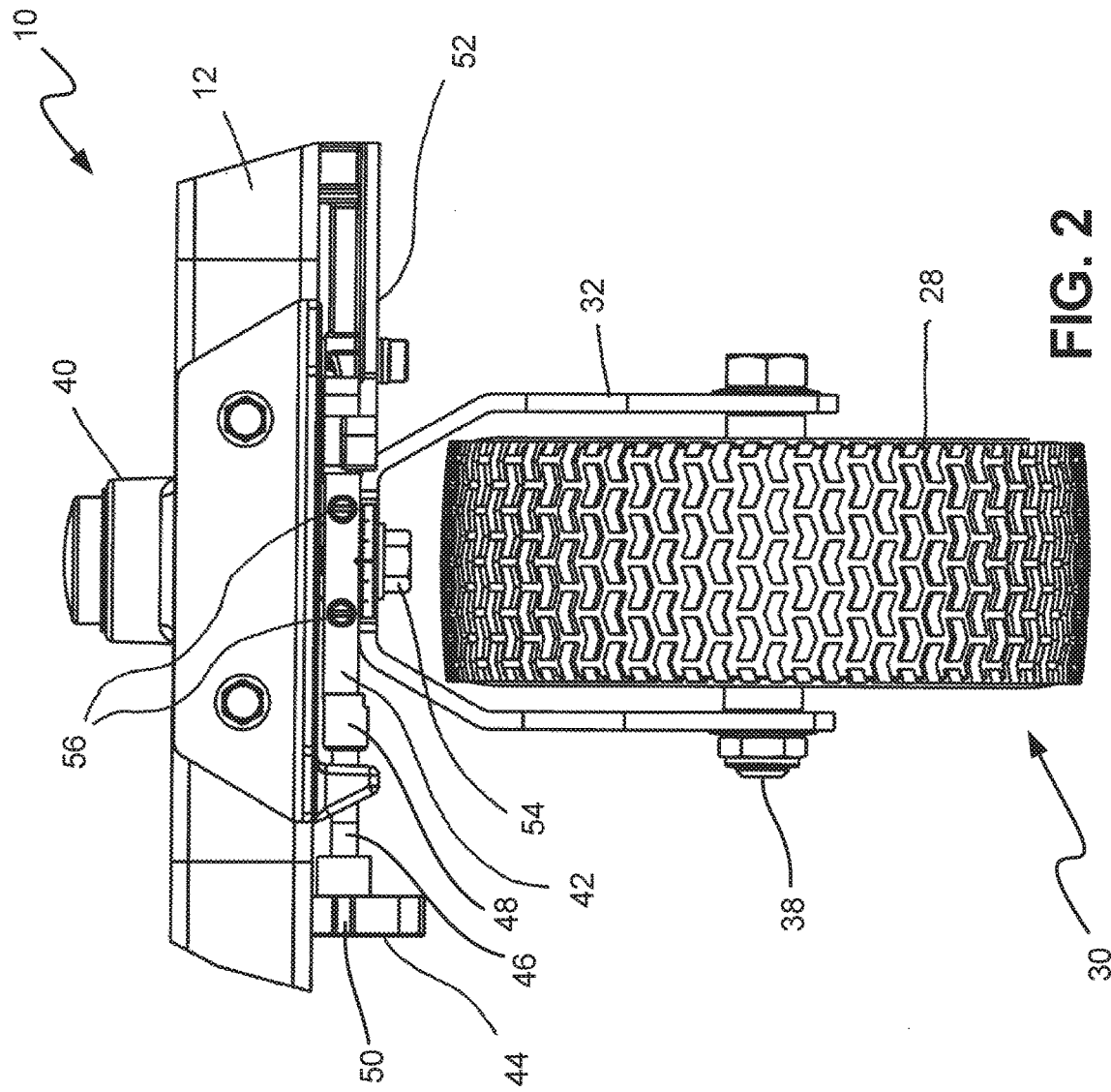
FIG. 2 is a front view of a portion of the line striper of FIG. 1 including a wheel assembly with a wheel alignment guide.

FIGS. 2-5 all provide views of a portion of line striper 10 including wheel assembly 30. FIG. 2 provides a front view of wheel assembly 30 and surrounding parts of line striper 10, FIG. 3 an upward-facing perspective view, FIG. 4 an exploded perspective view, and FIG. 5 a partial cross-sectional view.

Figure 3:
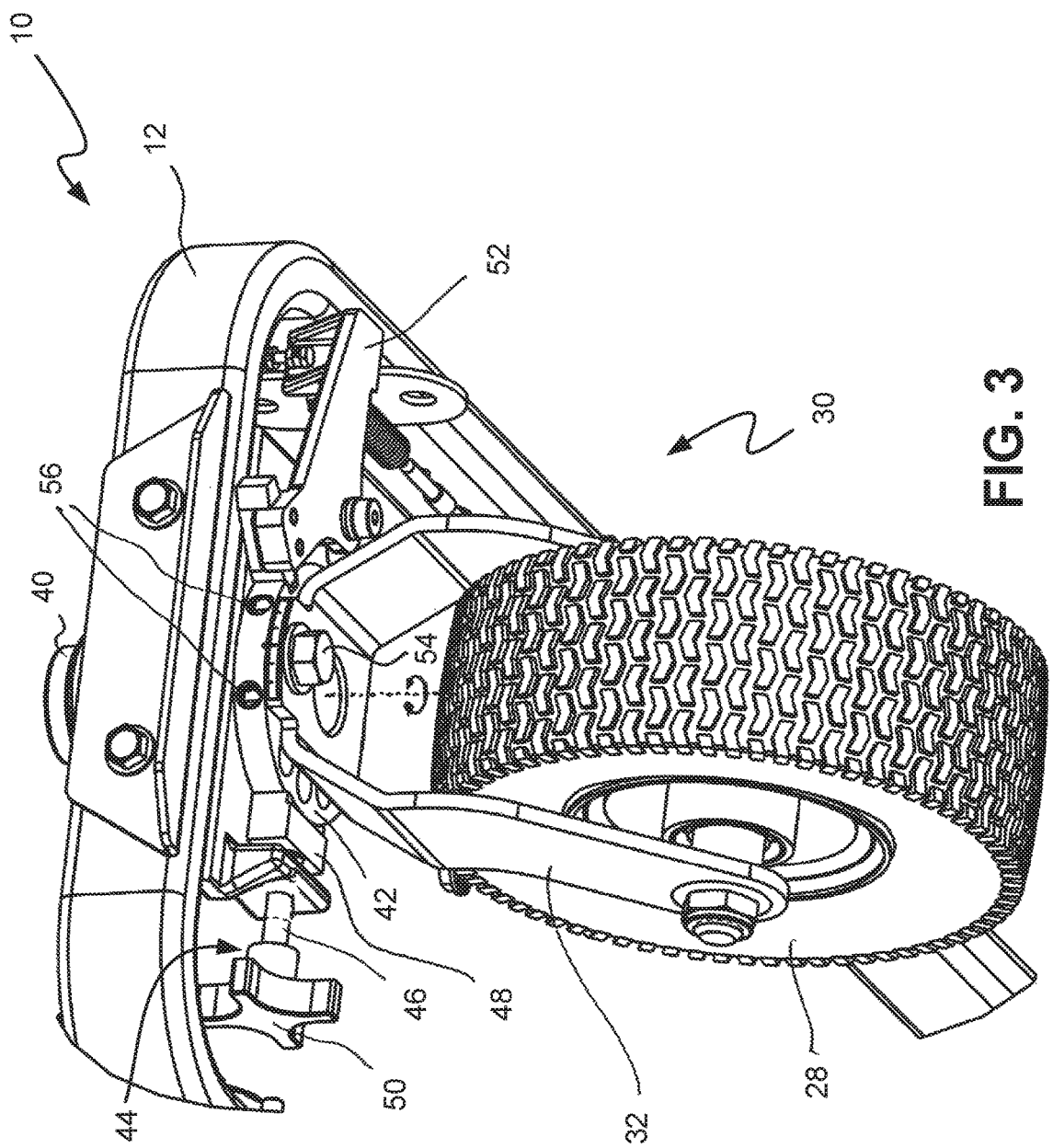
FIG. 3 is a perspective view of the wheel assembly of FIG. 2.

FIGS. 2 and 3 together illustrate frame 12, guide wheel 28 of guided wheel assembly 30, fork 32, wheel axle 38, hub 40, alignment plate 42, antirotation clamp 44 (with screw 46, pad 48, and handle 50), antirotation lock 52, alignment locking bolt 54, and fine alignment screws 56. In the illustrated embodiment, fork 32 is attached to guide wheel 28 via wheel axle 38. Fork 32 is rotatably supported on frame 12 by hub 40, and is anchored to alignment plate 42 at a top side of fork 32. Alignment plate 42 is a plate or dish that can rotate relative to frame 12, thereby allowing guide wheel 28 to rotate relative to frame 10. Alignment plate 42 is typically fixed (i.e. prevented from rotating) relative to frame 12 while spraying straight lines, however, such that guide wheel 28 remains locked in a straight forward orientation (as depicted in FIG. 2) so as to guide line striper 10 in a straight path. Although wheel assembly 30 is illustrated with fork 32 supporting a single guide wheel 28, other embodiments of the present invention may use multiple guide wheels 28 operating in tandem and supported by appropriate axles and mounts. Rotation of alignment plate 42 (and consequently of guide wheel 28 and guided wheel assembly 30) relative to frame 12 permits line striper 10 to turn, but consequently makes the spraying of perfectly straight lines difficult.

The orientation of wheel assembly 30 can be fixed by two independent means: antirotation clamp 44 and antirotation lock 52. Antirotation clamp 44 is a continuous brace comprising screw 46, pad 48, and handle 50. Antirotation clamp 44 is engaged by turning handle 40 to torque screw 46, thereby advancing pad 48 into tight friction contact with alignment plate 42. Antirotation clamp 44 is locked to frame 12, such that alignment plate 42 is unable to move relative to frame 12 while pad 48 is clamped to alignment plate 42. In the illustrated embodiment, antirotation clamp 44 can be manually actuated by turning handle 50 to tighten screw 46 (thereby clamping alignment plate 42) or loosen screw 46 (thereby unclamping alignment plate 42). In alternative embodiments, however, antirotation clamp 44 can be actuated automatically or remotely, e.g. via operator station 34 (see FIG. 1). In some embodiments, antirotation clamp 44 can be used when painting lines in regular curves.

Figure 6:
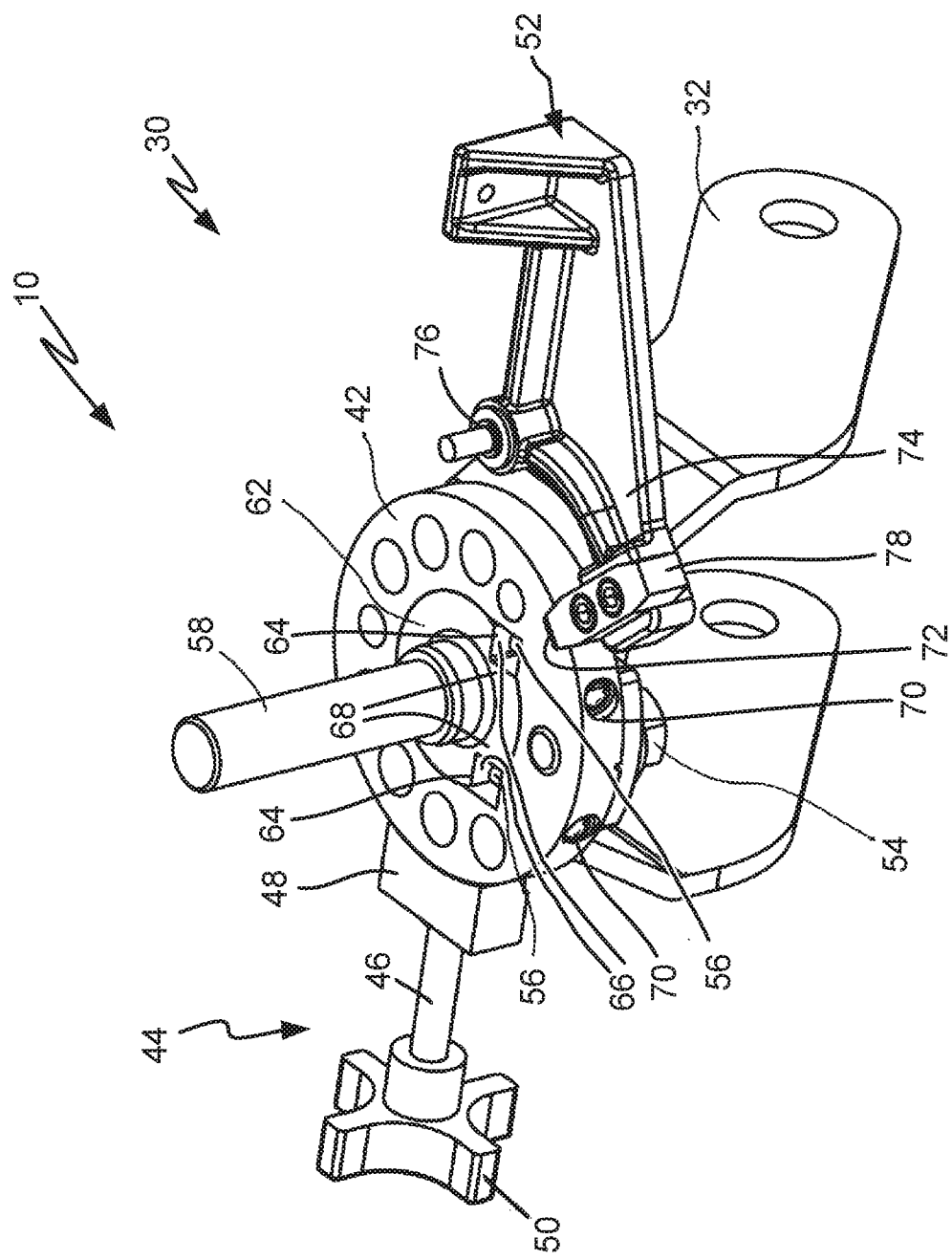
FIG. 6 is a perspective view of an alignment plate of the wheel assembly of FIGS. 2-5.

Antirotation lock 52 provides an alternative or additional independent means of fixing wheel assembly 30. Antirotation lock 52, which is described in greater detail below with respect to FIG. 6, is anchored to frame 12 and has a projection that interfaces with an indexed notch or notches on the periphery of alignment plate 42, thereby preventing alignment plate 42 from rotating relative to frame 12 so long as antirotation lock 52 is engaged. In at least some embodiments antirotation lock 52 is engaged and disengaged via wheel release control 36, e.g. via a cable, belt, or motorized actuator. Unlike antirotation clamp 44, antirotation lock 52 fixes alignment plate 42 only at indexed orientations, such as in a forward orientation for painting straight lines.

Guided wheel assembly 30 is ordinarily fixed to alignment plate 42 via alignment locking bolt 54. A variety of factors can cause misalignment of guided wheel assembly 30 relative to frame 12, however. Wear to tires of wheels 26, bending or other deformation of fork 32 (e.g. due to collision with a curb while line striping), and other factors can cause sudden shifts and/or gradual drifts from proper alignment. As noted above, misalignment of guided wheel assembly 30 can introduce a turn into the "straight" path of line striper 10, causing it to generate lines that are not straight. In some embodiments fork 32 and alignment plate 42 can include ticks that align to indicate a degree of alignment or misalignment. Alignment locking bolt 54 can be loosened to allow fork 32 to be rotated or otherwise resituated relative to alignment plate 42. In practice, however, precise adjustment of the angular orientation of alignment plate relative to fork 32 is difficult and time consuming. To address this shortcoming, the present disclosure introduces a fine alignment mechanism including fine alignment screws 56 for rapid and precise adjustment and realignment of guided wheel assembly 30 with alignment plate 42. Fine alignment screws 56 fit through threaded holes in alignment plate 42 and can be screwed inward or outward to adjust the alignment of fork 32 (and more generally guided wheel assembly 30), as discussed in greater detail below. Alignment locking bolt 54 is loosened for any realignment operation. Fine alignment screws 56 then are used to adjust an orientation while alignment locking bolt 54 is loose, and alignment locking bolt 54 is subsequently tightened to lock in the adjusted alignment.

FIGS. 4 and 5 together illustrate the support structure of guided wheel assembly 30 and surrounding parts of line striper 10. FIG. 4 provides an exploded view of guided wheel assembly 30, fork 32, hub 40, alignment plate 42, antirotation clamp 44 (with screw 46, pad 48, and handle 50 as described above), antirotation lock 52, spindle axle 58, and bearings 60, and adjustment disk 62. FIG. 5 provides a partial cross-sectional view of fork 32, hub 40, spindle axle 58, and bearings 60, with handle 40 of antirotation clamp 44 in the foreground.

As depicted in FIGS. 4 and 5, spindle axle 58 extends upward from the crux of the arms of fork 32. Spindle axle 58 is a substantially cylindrical element sized and shaped to be housed within hub 40. Spindle axle 48 carries hub 40 via bearings 60, which can for example be cylindrical, ball, or tapered bearings. Bearings 60 transfer the load on hub 40 to spindle axle 58 while allowing spindle axle 58 (and consequently fork 32) to rotate relative to hub 40. FIG. 5 further depicts adjustment disk 62, which engages fine adjustment screws 56 (see FIGS. 2 and 3) to precisely adjust alignment of fork 32 and thereby guided wheel assembly 30, as discussed below.

FIG. 6 is a perspective view of guided wheel assembly 30 and surrounding components of line sprayer 10, including fork 32, alignment plate 42 (with screw recesses 70 and locking notch 72), antirotation clamp 44 (with screw 46, pad 48, and handle 50 as described above), antirotation lock 52 (with antirotation arm 74, antirotation pivot 76, and antirotation lug 78), alignment locking bolt 54, fine alignment screws 56, adjustment disk 62 (with screw notches 64 defined by adjustment surfaces 66 and notch surfaces 68).

As shown in FIG. 6, alignment plate 42 is a substantially annular structure with a hollow cavity into which adjustment disk 62 fits. Adjustment disk 62 is anchored to spindle axis 58, and consequently shares an angular orientation with respect to frame 12 with fork 32. The outer diameter of adjustment disk 62 abuts the inner diameter of alignment plate 42, except where the outer diameter of adjustment disk is interrupted by screw notches 64. Screw notches 64 provide lands to receive fine alignment screws 56. In the depicted embodiment, both screw notches 64 are defined entirely by coplanar adjustment surfaces 66 and parallel notch surfaces 68 at right angles to adjustment surfaces 66. More generally, screw notches 64 have provide adjustment surfaces close to perpendicular to fine adjustment screws 56, such that advancing or retreating fine adjustment screws 56 brings them into contact with or retracts them from contact with adjustment disk 62. Adjustment disk 62 can rotate within alignment plate 42. Fine alignment of guided wheel assembly 30 is accomplished by first loosening alignment locking bolt 54, then loosening one fine alignment screw 56 sufficiently to permit adjustment disk 62 to rotate a desired small angle with respect to alignment plate 42, then tightening the other fine alignment screw 56. Retreating one fine alignment screw 56 releases pressure on both adjustment surfaces 66, permitting one or both fine alignment screws 56 to be retightened to place adjustment disk 62 into a different position relative to alignment plate 42. Because adjustment disk 62 is secured to spindle axle 58, this adjustment recalibrates the angular orientation fork 32 and wheel assembly 30 for a given orientation of alignment plate 42.

In the illustrated embodiment, fine adjustment screws 56 are secured within parallel threaded passageways passing through alignment plate 42. In some embodiments, these passageways may include screw recesses 70 allowing fine alignment screws 56 to be recessed within alignment plate 42 even after adjustments that may include retreating one fine alignment screw and advancing another. To allow fine adjustment, fine alignment screws 56 and their threaded passages may be separated by a distance at least 50% the diameter of adjustment disk 62. Screw notches 64 can correspondingly be situated facing the same direction, separated by 60-90° with respect to the axis of spindle axle 58. Larger or smaller angular separations are possible, but can make adjustment more difficult by decreasing leverage applied by adjusting fine alignment screws 56.

As discussed above, antirotation clamp 44 can be used to fix alignment plate 42 relative to frame 12. Antirotation lock 52 can similarly fix alignment plate 42 relative to frame 12. Antirotation lock 52 includes antirotation arm 74, which can pivot about antirotation pivot 76 (anchored to frame 12) to engage or disengage antirotation lug 78 with locking notch 72 in alignment plate 42. In some embodiments, antirotation lock 42 can engage or disengage antirotation lug 78 with locking notch 72 in response to actuation of wheel release control 36. Wheel release control 36 can, for example, be a pedal, lever, or grip coupled to antirotation arm 74 by a cable, belt, or chain, such that actuation of wheel release control 36 rotates antirotation arm 74 about antirotation pivot 76 to engage or disengage antirotation lug 78. Antirotation lock 52 can be biased towards an open (unlocked) or closed (locked) state, or can be unbiased such that wheel release control 36 simply switches between states. Whenever antirotation clamp 44 or antirotation lock 52 fix the orientation of alignment plate 42 relative to frame 12, fine adjustments to the angle of adjustment disk 62 relative to alignment plate 42 allow guided wheel assembly 30 to be precisely aligned for straight line painting or other fixed shape painting (e.g. painting curved lines with constant turning angle).

Adjustment disk 62 and fine alignment screws 58 provide means for the orientation of spindle axle 58 (and thereby guided wheel assembly 30) to be precisely adjusted relative to alignment plate 42. This adjustment enables wheels of line striper 10 to be precisely aligned to produce straight lines or other fixed patterns when fixing mechanisms such as antirotation lock 52 or antirotation clamp 44 are employed.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

DISCUSSION OF POSSIBLE EMBODIMENTS

The following are non-exclusive descriptions of possible embodiments of the present invention.

A line striper comprises: a wheeled frame; a fluid reservoir mounted on the wheeled frame; a sprayer mounted to the wheeled frame, and fluidly connected to the fluid reservoir to receive spray fluid; a guided wheel assembly rotatably mounted to the frame, such that rotational orientation of the guided wheel assembly relative to the frame determines a turning angle of the wheeled frame, the guided wheel assembly comprising: a spindle axle secured to but rotatable with respect to the wheeled frame; a guide wheel secured to the spindle axle, and rotatable therewith; an adjustment disk fixedly anchored to the spindle axle, and having first and second screw notches in its outer diameter, the first and second screw notches having first and second adjustment surfaces, respectively; an alignment plate surrounding and rotatably abutting the adjustment disk, the alignment plate having a locking feature; and first and second alignment screws threadable through the alignment plate into the screw notches of the adjustment disk to abut the adjustment surfaces and thereby determine a rotational alignment of the alignment plate relative to the adjustment disk.

The line striper of the preceding paragraph can optionally include, additionally and/or alternatively, any one or more of the following features, configurations and/or additional components:

A further embodiment of the foregoing line striper, further comprising: an antirotation lock fixed to the wheeled frame and actuatable to engage and disengage the locking feature of the alignment plate, thereby fixing the orientation of the guide wheel relative to the wheeled frame.

A further embodiment of the foregoing line striper, further comprising a manual release, and wherein the antirotation lock is biased to engage the locking feature except when actuated by the manual release.

A further embodiment of the foregoing line striper, wherein the locking feature comprises a locking notch in the alignment plate, and further wherein the antirotation lock comprises a locking lug fitted to the locking notch and pivotable away from the locking notch via a rotatable locking arm.

A further embodiment of the foregoing line striper, wherein the locking notch is disposed in an outer diameter of the alignment plate.

A further embodiment of the foregoing line striper, wherein the sprayer is not moved relative to the wheeled frame during operation, such that the position and orientation of the sprayer is fully determined by the position and orientation of the wheeled frame.

A further embodiment of the foregoing line striper, wherein the alignment plate includes parallel first and second threaded screw passages disposed to position the first and second adjustment screws adjacent the first and second screw notches.

A further embodiment of the foregoing line striper, wherein the parallel first and second threaded screw passages are separated by a distance at least 50% the diameter of the adjustment disk.

A further embodiment of the foregoing line striper, wherein the first and second threaded screw passages permit the first and second adjustment screws to be recessed into the alignment plate when fully engaged with the adjustment disk.

A further embodiment of the foregoing line striper, wherein the first and second adjustment surfaces are coplanar.

A further embodiment of the foregoing line striper, wherein the first and second screw notches are each defined by the coplanar first and second adjustment surfaces and by parallel first and second notch surfaces.

A further embodiment of the foregoing line striper, wherein guide wheel is secured to the spindle axle via a fork having arms bracketing the guide wheel.

A further embodiment of the foregoing line striper, wherein a substantially cylindrical inner diameter of the alignment plate abuts the outer diameter of the adjustment disk except at the first and second screw notches.

A further embodiment of the foregoing line striper, wherein the first and second screw notches are separated by at least sixty degrees with respect to an axis of the spindle axle.

A further embodiment of the foregoing line striper, wherein the first and second screw notches are separated by less than ninety degrees with respect to the axis of the spindle axle.

An alignment method for a line striper comprising a sprayer affixed to frame, and a guide wheel rotatably secured to the frame via a spindle axle, the method comprising: engaging a locking feature of an alignment plate via an antirotation lock affixed to the frame; threading first and second alignment screws through the alignment plate to engage adjustment surfaces of screw notches in an outer diameter of an adjustment disk disposed coaxially within the alignment plate and affixed to the spindle axis; and turning the first and second alignment screws to adjust a rotational orientation of the alignment plate relative to the adjustment disk, such that the guide wheel is oriented in a forward direction while the locking feature is engaged by the antirotation lock.

The method of the preceding paragraph can optionally include, additionally and/or alternatively, any one or more of the following features, configurations and/or additional components:

A further embodiment of the foregoing method, wherein turning the first and second alignment screws comprises loosening the first screw and subsequently tightening the second screw, such that the first and second screws both abut the adjustment surfaces of the screw notches.

A further embodiment of the foregoing method, wherein the alignment screws are parallel and the adjustment surfaces are coplanar, such that once tightened, the first and second alignment screws both abut the adjustment surfaces at identical angles that define an alignment adjustment to the spindle axle.

A further embodiment of the foregoing method, wherein the antirotation lock is biased to engage the locking feature via a biasing force, such that selectively engaging the locking feature comprises rotating the spindle axis such that the locking feature is aligned with the antirotation lock, and permitting the antirotation lock to engage the locking feature under the biasing force.

A further embodiment of the foregoing method, wherein selectively engaging the locking feature comprises inserting an antirotation lug into a locking notch along an outer diameter of the alignment plate.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A line striper comprises:
   a wheeled frame;
   a fluid reservoir mounted on the wheeled frame;
   a sprayer mounted to the wheeled frame, and fluidly connected to the fluid reservoir to receive spray fluid;
   a guided wheel assembly rotatably mounted to the frame, such that rotational orientation of the guided wheel assembly relative to the frame determines a turning angle of the wheeled frame, the guided wheel assembly comprising:
      a spindle axle secured to but rotatable with respect to the wheeled frame;
      a guide wheel secured to the spindle axle, and rotatable therewith;
      an adjustment disk fixedly anchored to the spindle axle, and having first and second screw notches in its outer diameter, the first and second screw notches having first and second adjustment surfaces, respectively;
      an alignment plate surrounding and rotatably abutting the adjustment disk, the alignment plate having a locking feature; and
      first and second alignment screws threadable through the alignment plate into the screw notches of the adjustment disk to abut the adjustment surfaces and thereby determine a rotational alignment of the alignment plate relative to the adjustment disk.

2. The line striper of claim 1, wherein the sprayer is not moved relative to the wheeled frame during operation, such that the position and orientation of the sprayer is fully determined by the position and orientation of the wheeled frame.

3. The line striper of claim 1, wherein guide wheel is secured to the spindle axle via a fork having arms bracketing the guide wheel.

4. The line striper of claim 1, wherein a substantially cylindrical inner diameter of the alignment plate abuts the outer diameter of the adjustment disk except at the first and second screw notches.

5. The line striper of claim 1, further comprising:
   an antirotation lock fixed to the wheeled frame and actuatable to engage and disengage the locking feature of the alignment plate, thereby fixing the orientation of the guide wheel relative to the wheeled frame.

6. The line striper of claim 5, further comprising a manual release, and wherein the antirotation lock is biased to engage the locking feature except when actuated by the manual release.

7. The line striper of claim 5, wherein the locking feature comprises a locking notch in the alignment plate, and further wherein the antirotation lock comprises a locking lug fitted to the locking notch and pivotable away from the locking notch via a rotatable locking arm.

8. The line striper of claim 7, wherein the locking notch is disposed in an outer diameter of the alignment plate.

9. The line striper of claim 1, wherein the alignment plate includes parallel first and second threaded screw passages disposed to position the first and second adjustment screws adjacent the first and second screw notches.

10. The line striper of claim 9, wherein the parallel first and second threaded screw passages are separated by a distance at least 50% the diameter of the adjustment disk.

11. The line striper of claim 9, wherein the first and second threaded screw passages permit the first and second adjustment screws to be recessed into the alignment plate when fully engaged with the adjustment disk.

12. The line striper of claim 1, wherein the first and second adjustment surfaces are coplanar.

13. The line striper of claim 12, wherein the first and second screw notches are each defined by the coplanar first and second adjustment surfaces and by parallel first and second notch surfaces.

14. The line striper of claim 1, wherein the first and second screw notches are separated by at least sixty degrees with respect to an axis of the spindle axle.

15. The line striper of claim 14, wherein the first and second screw notches are separated by less than ninety degrees with respect to the axis of the spindle axle.

16. An alignment method for a line striper comprising a sprayer affixed to frame, and a guide wheel rotatably secured to the frame via a spindle axle, the method comprising:
   engaging a locking feature of an alignment plate via an antirotation lock affixed to the frame;
   threading first and second alignment screws through the alignment plate to engage adjustment surfaces of screw notches in an outer diameter of an adjustment disk disposed coaxially within the alignment plate and affixed to the spindle axis; and turning the first and second alignment screws to adjust a rotational orientation of the alignment plate relative to the adjustment disk, such that the guide wheel is oriented in a forward direction while the locking feature is engaged by the antirotation lock.

17. The alignment method of claim 16, wherein turning the first and second alignment screws comprises loosening the first screw and subsequently tightening the second screw, such that the first and second screws both abut the adjustment surfaces of the screw notches.

18. The alignment method of claim 16, wherein the alignment screws are parallel and the adjustment surfaces are coplanar, such that once tightened, the first and second alignment screws both abut the adjustment surfaces at identical angles that define an alignment adjustment to the spindle axle.

19. The alignment method of claim 16, wherein the antirotation lock is biased to engage the locking feature via a biasing force, such that selectively engaging the locking feature comprises rotating the spindle axis such that the locking feature is aligned with the antirotation lock, and permitting the antirotation lock to engage the locking feature under the biasing force.

20. The alignment method of claim 16, wherein selectively engaging the locking feature comprises inserting an antirotation lug into a locking notch along an outer diameter of the alignment plate.

* * * * *